United States Patent [19]
Kurzweil et al.

[11] Patent Number: 6,033,224
[45] Date of Patent: Mar. 7, 2000

[54] READING MACHINE SYSTEM FOR THE BLIND HAVING A DICTIONARY

[75] Inventors: Raymond C. Kurzweil, Newton; Firdaus Bhathena, Cambridge; Stephen R. Baum, Needham, all of Mass.

[73] Assignee: Kurzweil Educational Systems, Waltham, Mass.

[21] Appl. No.: 08/884,591

[22] Filed: Jun. 27, 1997

[51] Int. Cl.[7] .......................... G09B 21/00; G09B 17/00; G09B 19/04; G06K 9/00

[52] U.S. Cl. ........................ 434/112; 434/116; 434/178; 434/185

[58] Field of Search .................... 434/112, 113, 434/116, 156, 157, 178, 185

[56] References Cited

U.S. PATENT DOCUMENTS 4,912,671  3/1990  Ishida ............................. 704/3
4,985,697  1/1991  Boulton ........................ 345/192

OTHER PUBLICATIONS

The Kurzweil Reading Machine, Kurzweil Computer Products, Inc., 1980.

Primary Examiner—Robert A. Hafer
Assistant Examiner—John Edmund Rovnak
Attorney, Agent, or Firm—Fish & Richardson, P.C.

[57] ABSTRACT

A reading machine for a blind or visually impaired person includes a computer system that causes the computer to load a definition file in accordance with the current word whose definition a user desires the reading machine to read aloud, extract from said definition file text corresponding to at least a first definition contained in said file, and synthesize speech corresponding to the extracted text to permit the definition to be read aloud. The reading machine includes a user input device including a user activated button that produces a signal that causes the computer to enter a definition mode to read a definition of current word being spoken by the reading machine.

22 Claims, 7 Drawing Sheets

FIG. 8 ial assistant, what is needed is an approach to allow

READING MACHINE SYSTEM FOR THE BLIND HAVING A DICTIONARY

BACKGROUND OF THE INVENTION

This invention relates generally to reading machines and more particularly to reading machines adapted for use by persons with severe visual impairments or blindness.

As it is known in the art, reading machines have been used to improve the educational attainment of individuals with learning disabilities. They have also been used with persons having visual impairment or blindness. In general, known reading machines are computer based. One of the functions of a reading machine is to read aloud to a user, words associated with a document. The document may be an electronically stored document (i.e., on magnetic or optical memory) or a printed document that is scanned into the reading machine by a scanner. Typically, the reading machine scans a document containing printed text producing an image file representation of the document and converts the image file representation into a text file. The text file is fed to speech synthesis software which under the control of the reading machine reads the document aloud to the user.

Although reading machines adapted for visually impaired or blind persons are computer based, since vision is not a significant source of input stimuli for such persons, other approaches which do not principally rely under the user's interaction with the machine through a monitor or display are needed in order to allow a user to control operation of the machine.

Thus, the typical reading machine for a blind person, in particular, will include a personal computer based computer system including a processor disk or mass storage device and a keypad. The system will also include an audio system, but it will generally not include a monitor although a monitor with special magnification software may be used by a person with severe but not total visual impairment. One of the big challenges, therefore, in providing such systems for visually impaired individuals, in particular those with total visual impairment, is to enable the user to easily control the system. In particular, what is needed is an approach to allow sophisticated features to be included on the system keeping in mind that vision is generally not available to typical users of these systems.

SUMMARY OF THE INVENTION

In accordance with the present invention, a computer program, for use in a reading machine for a blind or visually impaired person, residing on a computer readable medium includes instructions for causing the reading machine including a computer responsive to instructions to load a definition file in accordance with a word whose definition a user desires the reading machine to read aloud. The program on the computer readable medium causes the computer to extract from said definition file text corresponding to at least a first definition contained in said file and synthesize speech corresponding to the extracted text. With such an arrangement, software is provided that can read a definition of a word to a user.

In accordance with a further aspect of the present invention, a reading machine for a blind or visually impaired person includes a computer system having a processor, an audio system including software to convert text into speech and speakers to transduce the converted text into speech that is read aloud to the user. The reading machine also includes a user input device including a user activated button that produces a signal that causes the computer to enter a definition mode to read a definition of a current word being spoken by the reading system. With such an arrangement, the use of a button or the like on a user input device enables the user to easily control the system without the use of a display device. In particular, this approach allows sophisticated features to be included on the system even though vision is generally not available to typical users of these types of systems.

BRIEF DESCRIPTION OF THE DRAWINGS

The foregoing features and other aspects of this invention will now be described in accordance with the following drawings, in which.

DESCRIPTION OF THE PREFERRED EMBODIMENTS

Figure 1:
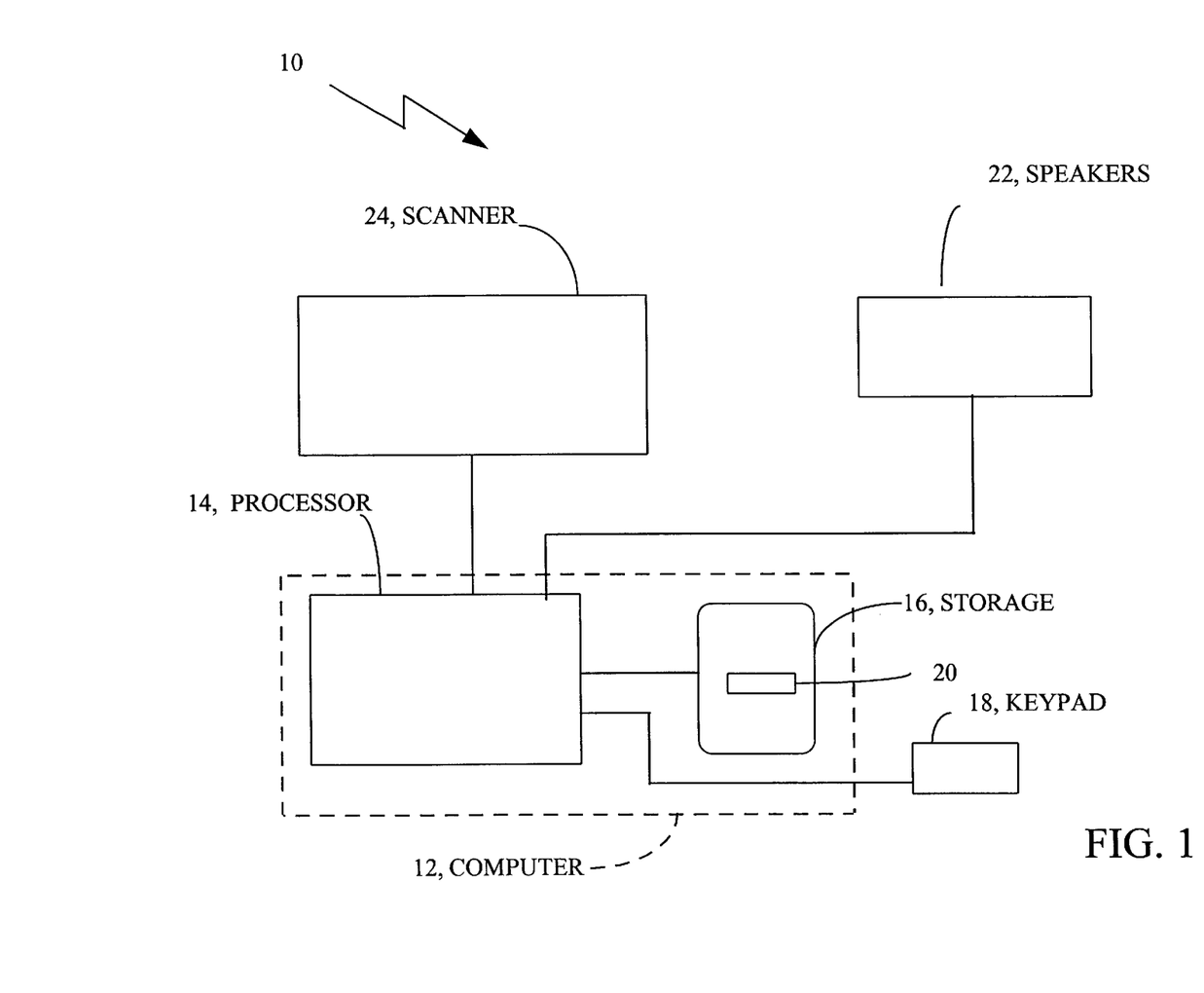
FIG. 1 is a block diagram view of a reading system particularly adapted for blind or visually impaired persons.

Referring now to FIG. 1, a reading machine 10 is shown to include a computer system 12. The computer system 12 is generally any personal computer system type or other types of computer systems and typically includes a central processor unit (not shown) that is part of a processor 14. A preferred implementation of the processor 14 is a Pentium® based system from Intel Corporation, Santa Clara, Calif. although other processors could alternatively be used. In addition to the CPU, the processor includes main memory, cache memory and bus interface circuits (not shown). The computer system 12 includes a mass storage element 16, here typically the hard drive associated with the personal computer system. Optionally, the reader can also include a monitor (not shown).

Figure 2:
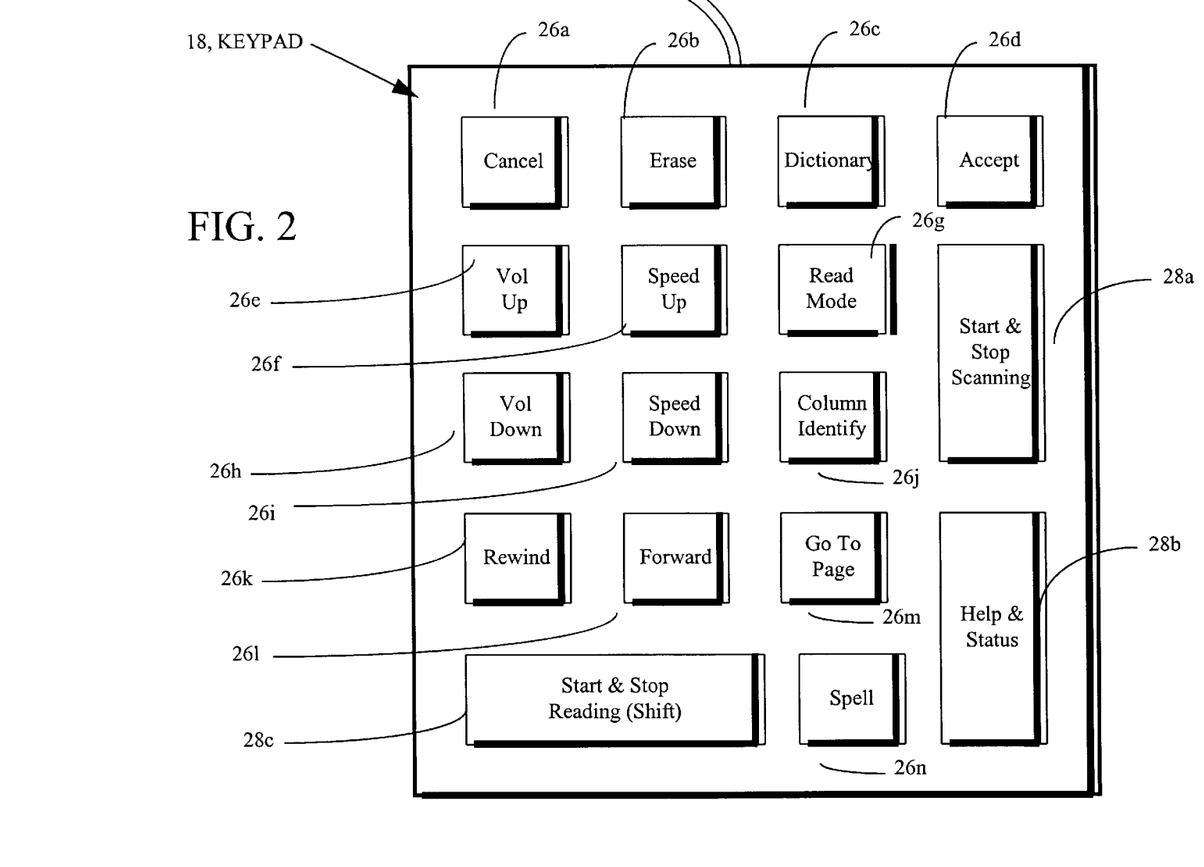
FIG. 2 is a pictorial representation of a keypad used in the system of FIG. 1.

The reading system 10 further includes a keypad 18 which is here a specialized component typically used in PC-based reading systems for the blind and includes a plurality of keys which have specialized features which will be further described in conjunction with FIG. 2. As an alternative to the keypad 18 other input devices such as a standard computer keyboard can also be used. Moreover, rather than a touch actuated type of control such as the keypad 18 the system can include a voice actuated control by inclusion of a microphone (not shown) and voice recognition software (not shown) to process voice commands, corresponding to the keypad functions, as will described.

In addition to the keypad, the system 10 also includes a set of speakers 22 and a scanner 24. The storage device 16, keypad 18, a sound card and speakers 22 and scanner 24 are all coupled to the processor 14 via appropriate interfaces and software drivers (not shown). In addition hardware speech synthesizers can alternatively be used rather than software speech synthesizers and sound cards.

Resident on the mass storage device 16 is image scanning, optical character recognition and speech synthesis software 20 that controls scanning of a document, conversion of an image provided from a printed document into a text file, and conversion of the text file by a speech synthesizer to produce synthetic speech. In addition, the software 20 permits the user to control via the keypad 18 various features of the reading machine 10 as will be described.

Referring now to FIG. 2, the keypad 18 is here shown to include a plurality of push buttons. In general, the push buttons are two types, a single wide push button such as represented by 26a and a dual wide push button represented by 28a. The keypad 18 is generally modeled after the numeric keypad arrangement found on most standard PC-based keyboards (not shown).

The user controls operation of the reading machine 10 by use of the keypad 18. The keypad 18 controls various features of the machine. In particular, the keypad controls the "reading mode" of operation of the reading machine 10. By use of the keypad 18 the user can start and stop reading a document and jump to different portions of a document. The user can change the speed or volume of a reading voice produced by the machine 10 in a generally conventional manner. In addition, the user can access language tools such as a dictionary or spelling tool as will be described below. The reading mode is here used to activate the voice command mode to permit the functions defined by the reading keys to be voice actuated by use of standard voice recognition software such as by holding down the key 28c and depressing voice down key 26h. Other arrangements are possible.

In the current embodiment, the keypad 18 can be configured or reconfigured to provide three major configurations. The first configuration is the reading keypad configuration. The keypad 18, configured in the reading pad configuration, is illustrated in FIG. 2 and includes small push buttons that provide respectively, cancel 26a, erase text 26b, dictionary 26c, accept 26d, volume up 26e, speed up 26f, read mode 26g, volume down 26h, speed down 26i, column identification 26j, rewind 26k, forward 26l, go to page 26m and spell 26n operations. The larger keys provide, respectively, start and stop scan 28a, help and status 28b, and start and stop read shift 28c.

In particular, the dictionary button 26c is used to initiate the reading machine to read aloud the definition for a particular word. The dictionary button is used in conjunction with the rewind key 26k and forward key 26l to allow the user to obtain the definition of a particular word. As will be described below, when the user desires the definition of a particular word, the user will use the rewind and forward keys 26k, 26l to navigate to the particular word and then press the dictionary button 26c. The reading machine 10 provides a definition of the last spoken word. After tapping the dictionary key, the reading machine 10 will indicate how many definitions are stored for the particular word and will read aloud the first definition. Again the rewind and forward keys 26k, 26l are used to move and navigate between definitions. By pressing the cancel key 26a, the reading machine leaves the definition mode. By pressing the start and stop reading key the reader resumes reading from that point in the document.

The keypad can be reconfigured to provide additional functional operations to the reading machine. The technique employed here to reconfigure the keypad 18 is to hold down the start and stop reading key and then press and release the accept key. This places the keypad into respectively the "reading keypad mode", "file management mode" and "settings mode". Although not to be described herein, suffice it here to say that in file management mode, the keypad is used to permit a user to open, close, create, delete and otherwise manage files in a generally conventional manner for such reading machine systems. Such files can include previously stored text files of scanned documents. Similarly, in the settings mode, the keypad 18 permits the user to change system settings such as to change the reading voice employed by the reading system 10, as well as controlling various features and modes of scanning.

Figure 3:
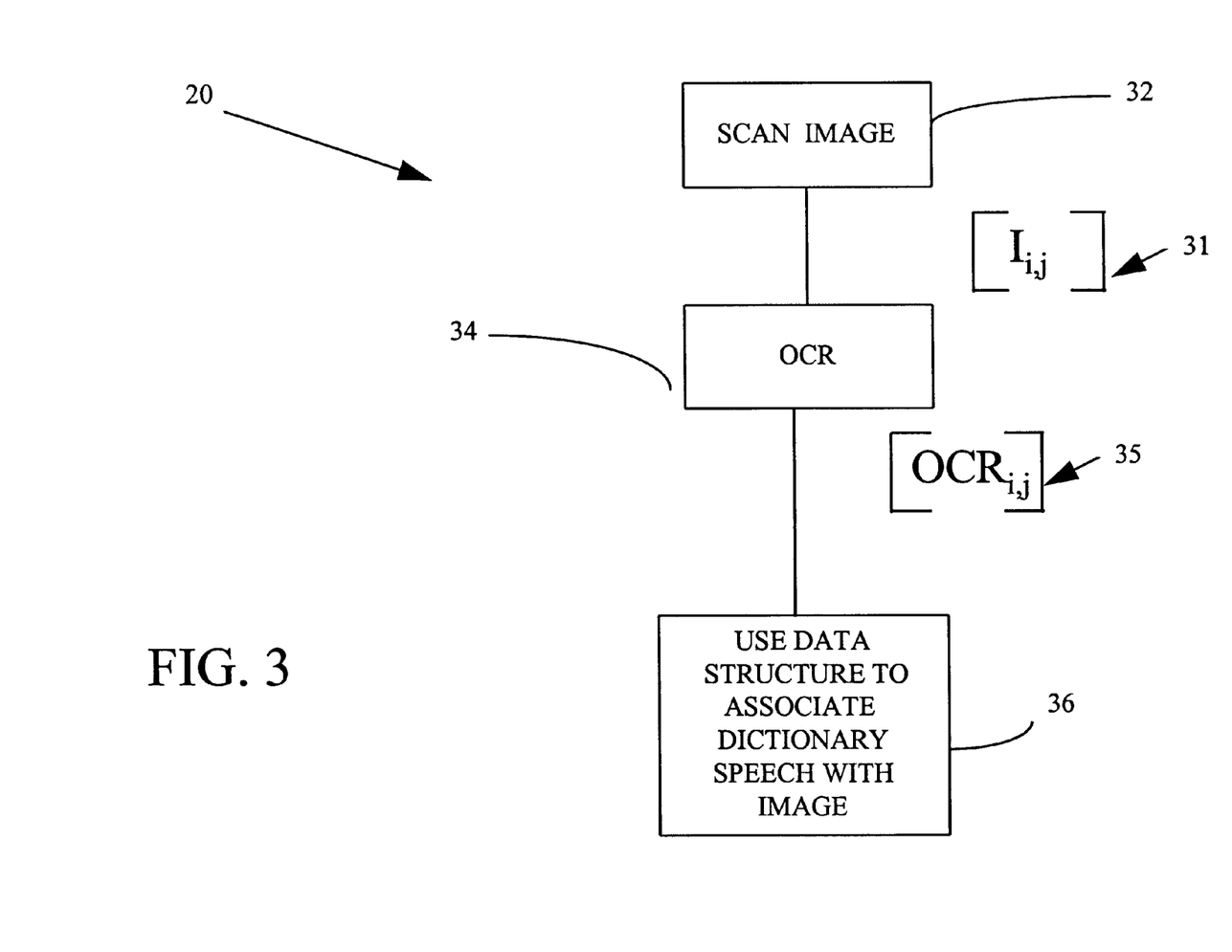
FIG. 3 is a flow chart showing steps used in processing a document for use in the reading system of FIG. 1.

Referring now to FIG. 3, the steps used in the image scanning and speech synthesis software 20 to read a scanned document aloud to the user and to permit the user to obtain the definition of words read aloud by the reading system is shown. Although the software will be described in conjunction with scanning a document, it must be understood that other types of inputs to the reading machine and selection of words to be defined by the reading machine are possible. For example, the source of the document could be a previously scanned, converted and stored representation of a document as well as a CD-ROM version of a document and so forth.

The user or an assistant will load a printed document on the scanner 24 and initiate a scanning by pressing the stop and start scan key 28a. The scanner 24 scans the document at step 32 and produces as a result an image file 31. The image file 31 is fed to OCR software 34 which converts the image file into a text file 35. The text file is provided to a speech synthesizer (not shown) to generate speech corresponding to the text file representation of the document and thus permit the reading system 10 to read the document allowed to the user. The text file 35 is fed to a software module 36 which uses the text file to associate data stored in the text file with a dictionary feature as will be described.

Figure 4:
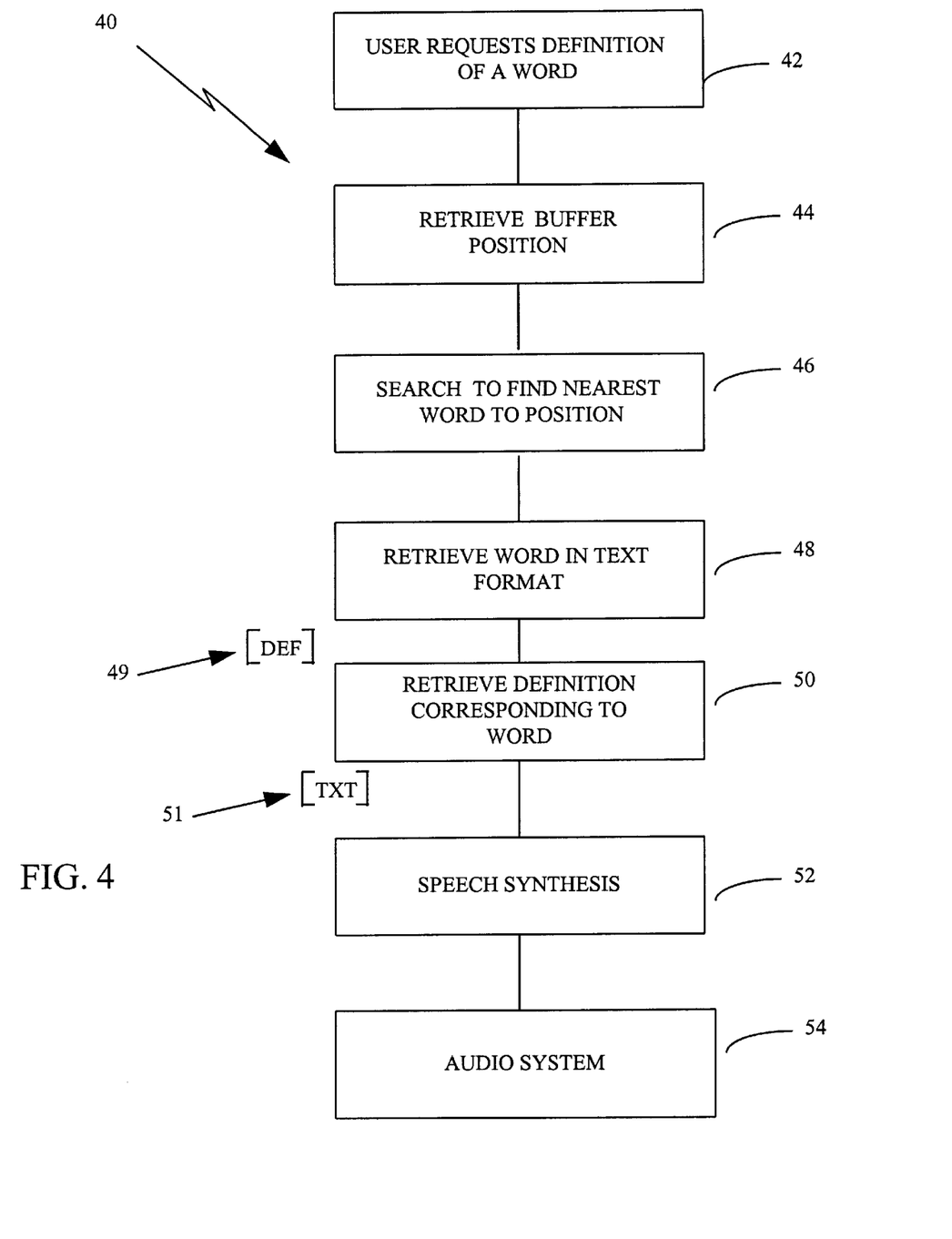
FIG. 4 is a flow chart showing steps used to associate text in the document to a synthesized voice rendition of the text and provide definitions of a word in the document.

Referring now to FIG. 4, the user controls operation of the reading system 10 to enable the user to obtain a definition of the last spoken word read aloud to the user.

A user illustratively initiates the reading of a scanned document by pressing the start and stop key 28c (FIG. 2). The reading machine reads the scanned document aloud to the user in a generally continuous manner a word at a time. The user at step 42 requests a definition of the word. The user requests such a definition by using the keypad keys 26c, 26k and 26l as mentioned above to initialize a pointer 33 to have a value which can locate the last spoken word in the text file 35. The user activates the definition feature by depressing the definition key 26c. Thus, at step 42 the software 36 is activated to provide a definition for the user.

Figure 5A:
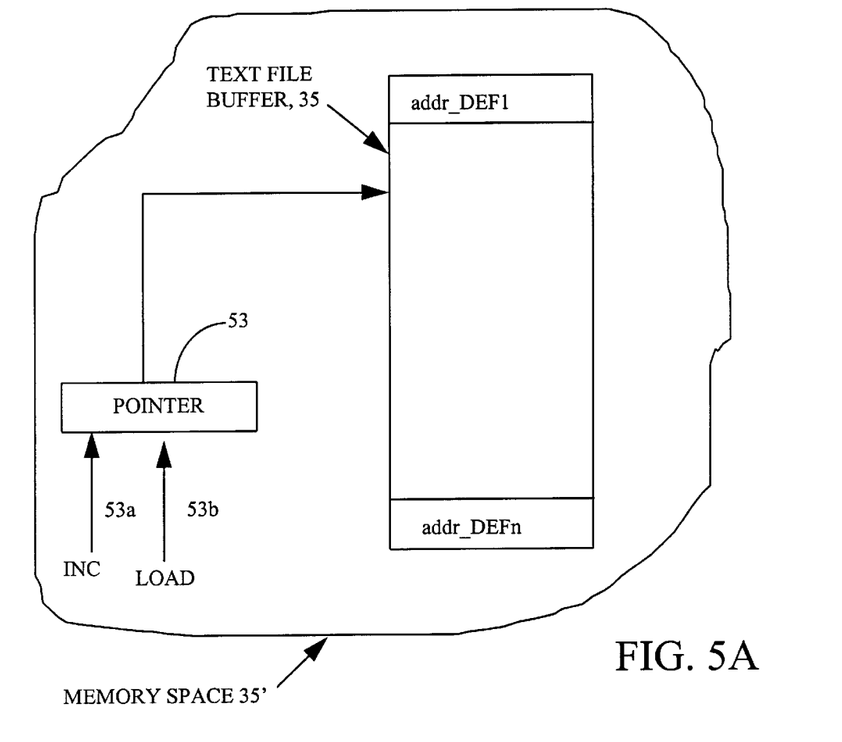
FIGS. 5A–5B are block diagrams of data structures used in conjunction with FIG. 4.

As illustrated in conjunction with FIG. 5A, in the reading system 10 the text file 35 representation of the entire document is buffered in memory (typically main memory or cache memory, not shown) 35'. The document is generally read aloud to the user a word at a time in a continuous fashion. Accordingly, there is a sense of the current word that was read aloud to the user provided by the value stored in a pointer 53. The pointer 53 contains the address of the last spoken word in the text file 35. The location of the current word is retained by storing in the pointer 53 the address of the word in buffer storage as illustrated in FIG. 5A. The pointer 53 is updated (via an increment event provided along line 53a) by recording completion of the last spoken word as will be described in conjunction with FIG. 6.

The software 36 retrieves the buffer position corresponding to the current word by reading the current value of the pointer. The software uses the buffer position to find the nearest word to the position. Thus, for example, if the mode of operation of the reader is in a spelling or reading letter by letter mode, for example, the step 46 will be used to find the current word.

Figure 5B:
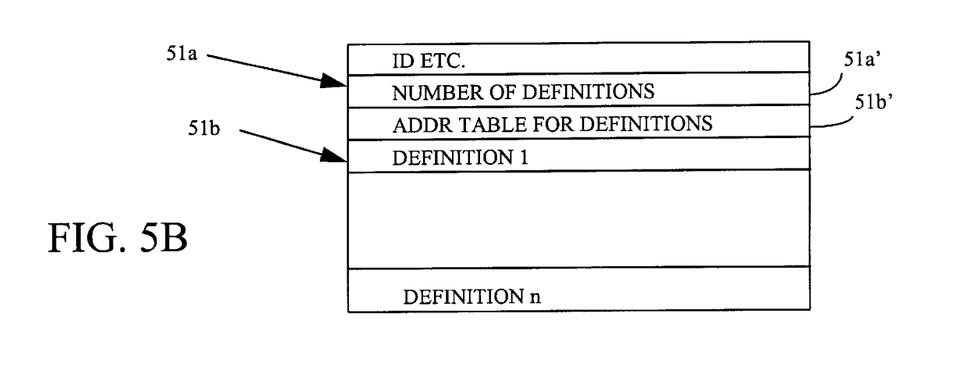

The current word will be retrieved in text format at step 48 and this current word will be sent to a conventional dictionary system at step 50 to produce an output data structure 51 as shown in conjunction with FIG. 5B. The output data structure 51 includes a header portion 51a and one or more definitions $DEF_1$ to $DEF_i$ contained in the element portion of the data structure 51b. The header portion 51a will include information such as the number of definitions in field 51a' provided for a particular word as well as a table 51a containing starting points for each of the definitions (<add $def_1$> to <add $def_i$>). At step 50 a definition is retrieved from this file by setting a pointer 82 to a selected one of the addresses indicating the start of a definition. Text corresponding to the selected definition is retrieved from the definition output data structure 51 at the location specified by the pointer 82. The retrieved text is fed to conventional speech synthesizing software 52 and onto the audio system 44 to permit the reading system 10 to read the selected definition.

Figure 6:
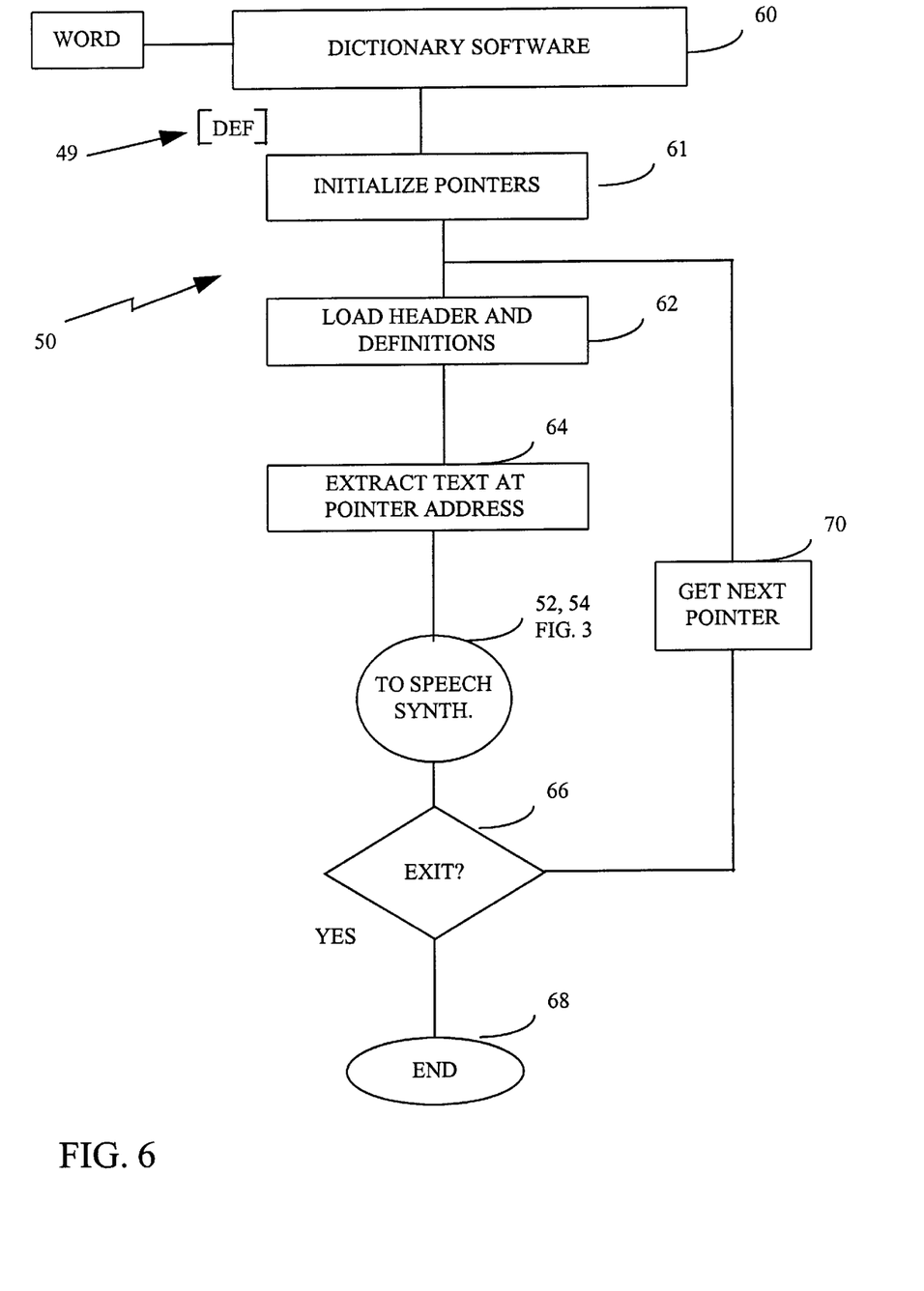
FIG. 6 is a flow chart showing the steps used to process a text file from a dictionary routine.

Referring now to FIG. 6, the retrieving definition step 50 is shown to include feeding a text format input of the selected word to the commercial definition software package at step 60 which produces in response to receiving the word the definition data structure 51 as shown in FIG. 5B. At step 62 the definition file 61 is loaded into memory and at step 64 text in the file is extracted from the file to be fed to the speech synthesizer and audio system, steps 52, 54 (FIG. 3) as mentioned above. For the first time through the software, information contained in the header will be fed to the speech synthesizing software to tell the user at least the number of definitions contained in the file for the word. The machine 51 will read aloud the first definition in the file.

Figure 7:
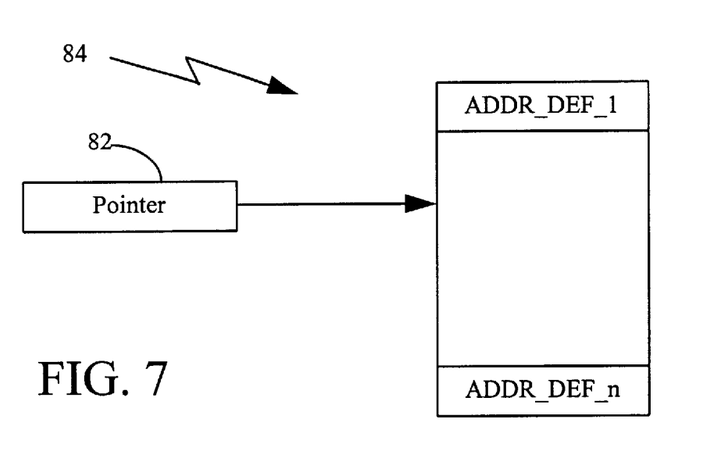
FIG. 7 is a diagram of a data structure.

In the above-described mode, the software will check for the presence of an exit condition at step 66. If an exit condition has been selected such as, for example, pressing the cancel key 26a to cancel the dictionary mode, control will transfer out of the routine at step 68. Otherwise, control will transfer to a routine which obtains the next address from a definition address table pointer 82 for a definition address table 84 (FIG. 7). The table 84 has software instructions provided from the address field 51a" in the header 51a of the definition data structure 51.

Figure 8:
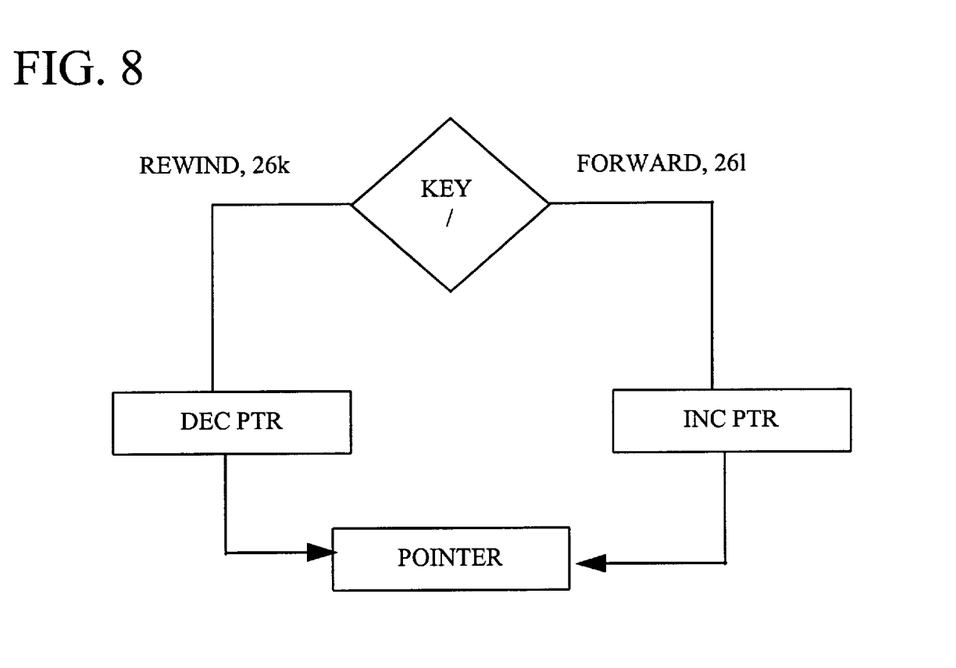
FIG. 8 is flow chart of a routine to update a pointer in the data structure of FIG. 7.

In general, definition address table 84 as illustrated in FIG. 7 is part of the header portion 51a of definition data structure 51 and provides a list of addresses corresponding to the start of each one of the definitions $def_1$ to $def_n$ contained in the particular definition data structure 51. The definition address table pointer 82 is a storage location which contains an address pointing to the first definition in the address definition table 84. The pointer is incremented or decremented by depressing respectively the rewind key 26k and the forward key 26l as generally mentioned above and shown in conjunction with FIG. 8. This provides essentially the next address into the definition address table 84.

Having described preferred embodiments of the invention, it will now become apparent to one of ordinary skill in the art that other embodiments incorporating its concept may be used. It is felt, therefore, that this invention should not be limited to the disclosed embodiment, but rather should be limited only by the spirit and scope of the appended claims.

What is claimed is:

1. A computer program, for use in a reading machine for a blind or visually impaired person, residing on a computer readable medium comprising instructions for causing a reading machine including a computer responsive to instructions to:

load a definition file in response to selecting a definition mode;

extract from said definition file, a text file corresponding to at least a first definition of a word selected by the user, whose definition the user desires the reading machine to read aloud; and synthesize speech corresponding to the extracted text.

2. The computer program of claim 1 wherein said program further comprises instructions for causing the computer to:

respond to depression of a key on a keyboard that corresponds to invocation of a dictionary program to provide the definition file and the definition of the word.

3. The computer program of claim 1 wherein said program further comprises instructions for causing the computer to:

search through the a file that contains text of the document for text corresponding to the word selected by the user; and respond to depression of a first key on a keyboard that corresponds to invocation of a definition of a word and respond to depression of a second key to select the word that the user desires to be defined.

4. The computer program of claim 1 wherein said program further comprises instructions for causing the computer to respond to a voice command to invoke the dictionary program.

5. A reading machine for a blind or visually impaired person comprising:

a computer system, said computer system comprising:
    a processor;
    an audio system including software to convert text into speech and speakers to transduce the speech to read the text aloud to the user;
    a user input device including a user activated button that produces a signal that causes the computer to enter a definition mode to read a definition of current word being spoken by the reading system.

6. The reading machine of claim 5 wherein said computer system further comprises a mass storage device having a computer program, for causing the processor of said reading machine to:

load a definition file in accordance with the current word whose definition a user desires the reading machine to read aloud;

extract from said definition file text corresponding to at least a first definition contained in said file; and synthesize speech corresponding to the extracted text to permit the definition to be read aloud.

7. The computer program product of claim 1 further comprising instructions to cause the processor to:

feed text from the text file corresponding to at least a first definition, a word at a time to the speech synthesizer; and update a pointer to correspond to a location in the text file of, a current word that was read aloud.

8. The computer program product of claim 7 wherein the pointer is updated by recording completion of the last spoken word.

9. The computer program product of claim 7 further comprising instructions to:
retrieve the position corresponding to the current word by reading the current value of the pointer; and
use the buffer position to find the nearest word to the position.

10. The computer program product of claim 9 wherein the current word is retrieved in text format and the text format is sent to a dictionary system to access the first definition.

11. The computer program product of claim 10 further comprising instructions to;
produce the definition file including a header portion, the first definition and one or more additional definitions, with the header portion including the number of definitions provided for the current word and starting points for each of the definitions.

12. The computer program product of claim 11 further comprising instructions to:
set a second pointer to a location in the definition file corresponding to a location that indicates the start of the definition selected by the user; and
retrieve the definition from the definition file at the location specified by the second pointer.

13. The computer program product of claim 12 wherein computer program product includes instructions to:
increment or decrement the second pointer when the software is in a definition mode in response to depression of a rewind key and/or a forward key on a user entry device.

14. The computer program product of claim 12 wherein computer program product includes instructions to:
increment or decrement the first pointer when the software retrieves the current word in response to depression of a rewind key and/or a forward key on a user entry device.

15. The reading machine of claim 6 wherein the computer program further comprises instructions to cause the processor to:
feed text from the text file corresponding to at least a first definition to the speech synthesizer; and
update a pointer to correspond to a location in the text file of, a current word that was read aloud.

16. The reading machine of claim 15 wherein the pointer is updated by recording completion of the last spoken word.

17. The reading machine of claim 15 wherein the software retrieves the position corresponding to the current word by reading the current value of the pointer, and uses the buffer position to find the nearest word to the position.

18. The reading machine of claim 17 wherein the current word is retrieved in text format and the text format is sent to a dictionary system to access the first definition.

19. The reading machine of claim 18 further comprising instructions to cause the processor to;
produce the definition file including a header portion, the first definition and one or more additional definitions, with the header portion including the number of definitions provided for the current word and starting points for each of the definitions.

20. The reading machine of claim 19 wherein the computer program further comprises instructions to cause the processor to:
set a second pointer to a location in the definition file corresponding to a location that indicates the start of the definition selected by the user; and
retrieve the definition from the definition file at the location specified by the second pointer.

21. The reading machine of claim 20 wherein the second pointer is incremented or decremented when the software is in a definition mode, by depressing respectively a rewind key and a forward key on the user entry device.

22. The reading machine of claim 21 wherein the first pointer is incremented or decremented when the software is in a retrieving a word mode, by depressing respectively a rewind key and a forward key on the user entry device.

* * * * *